Dec. 11, 1951 J. Y. TAYLOR 2,578,104
LIQUID LEVEL GAUGE
Filed July 31, 1946 2 SHEETS—SHEET 1

INVENTOR.
JAMES Y. TAYLOR
BY
Raymond A. Paquin

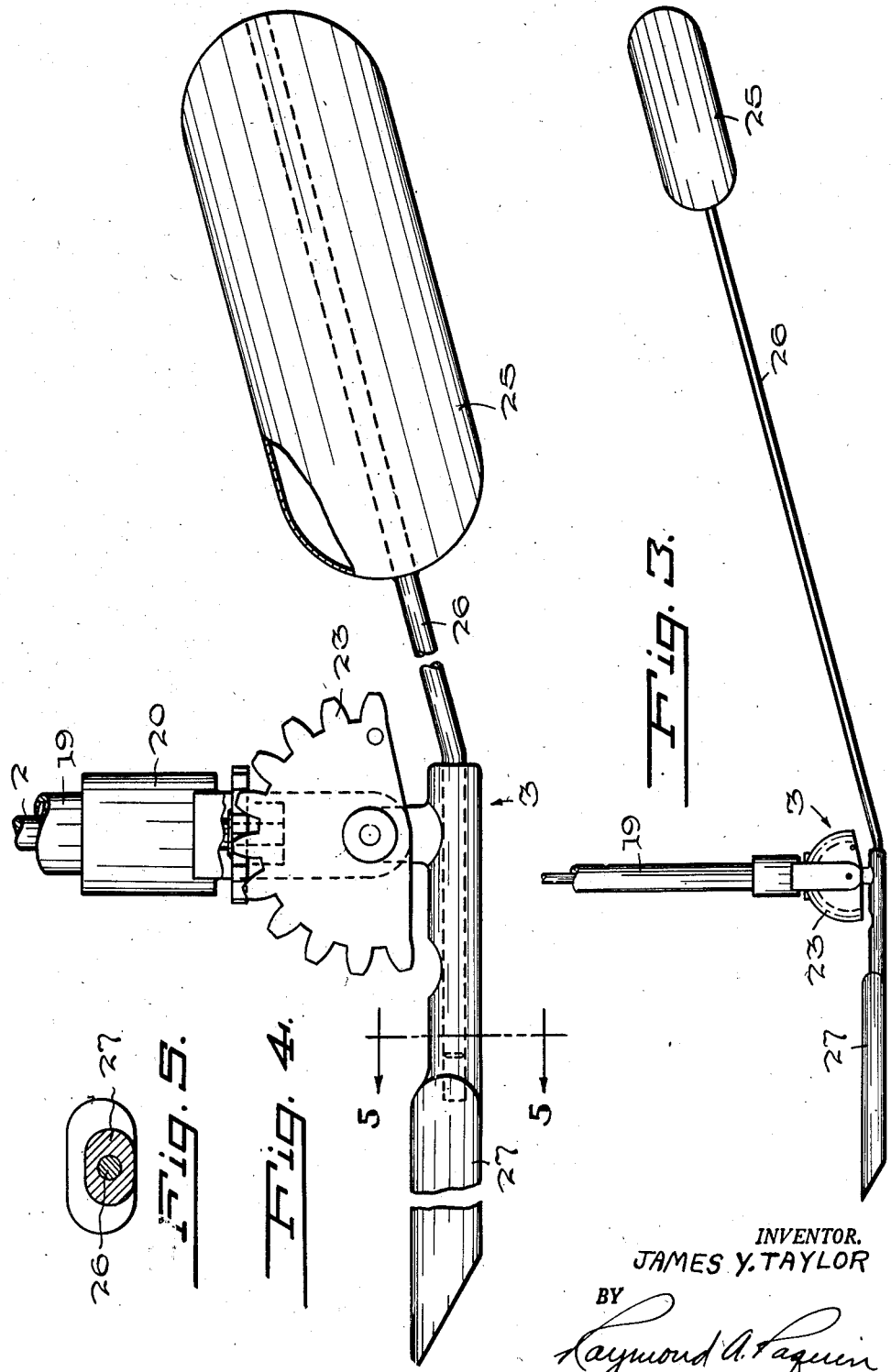

UNITED STATES PATENT OFFICE 2,578,104

LIQUID LEVEL GAUGE

James Y. Taylor, Garland, Tex.

Application July 31, 1946, Serial No. 687,341

1 Claim. (Cl. 73—317)

This invention relates to new and useful improvements in liquid level gages, and has particular reference to leakproof magnetic type liquid level gages for fluids or liquified gases and especially those stored under pressure such as butane and propane.

An object of the invention is to simplify the construction of gages or indicating devices of the class disclosed herein whereby to obtain an improved form of device of a unitary construction which is economical to manufacture.

Another object of the invention is to provide a new and improved device of the character described wherein the weight or counterweight may be accurately controlled according to the length of float arm employed.

Another object of the invention is to provide a new and improved liquid level gage of the character described wherein the float arm, counterweight and gear are formed effectively integral, thereby providing an accurate, trouble free construction.

Another object of the invention is to provide a new and improved, effectively integral counterbalance weight, gear and float arm construction for liquid level gages whereby said weight and gear may be formed and secured to said float arm in a single operation and wherein the size of said weight may be controlled according to the length of float arm employed.

Other objects and advantages of the invention will be apparent from the following description taken in connection with the accompanying drawings. It will be understood that many changes may be made in the details of construction and arrangement of parts shown and described without departing from the spirit of the invention as expressed in the accompanying claim. I, therefore, do not wish to be limited to the exact details of construction and arrangement of parts shown and described as the preferred form has been shown and described by way of illustration only.

Referring to the drawings:

Fig. 3 is a fragmentary side view taken along line 3—3 of Fig. 1, looking in the direction of the arrows;

Fig. 4 is a fragmentary view, generally similar to Fig. 3 but on an enlarged scale; and Fig. 5 is a sectional view taken on line 5—5 of Fig. 4, looking in the direction of the arrows.

Figure 1:
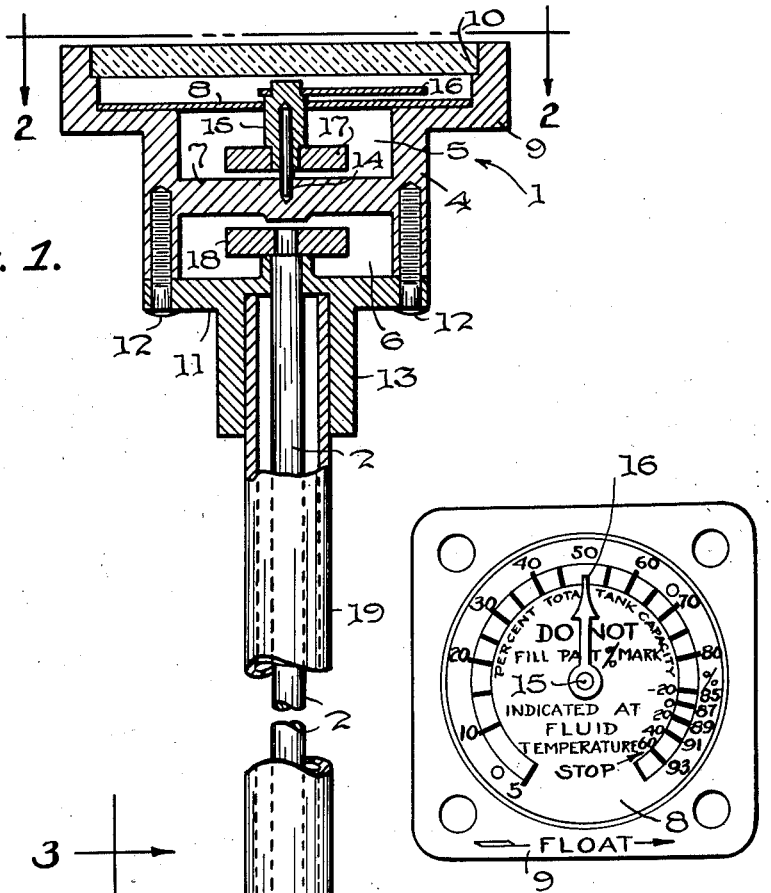
Fig. 1 is a sectional view of a gage embodying the invention.
Figure 2:
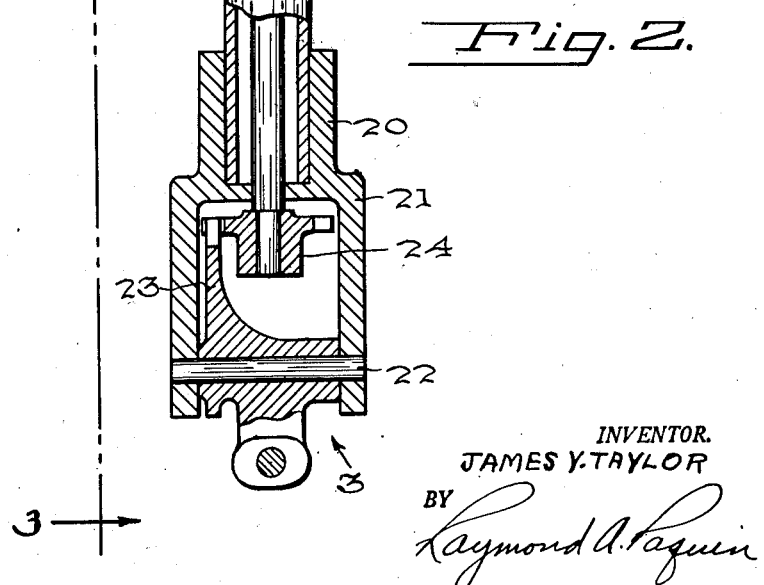
Fig. 2 is an end view taken along line 2—2 of Fig. 1, looking in the direction of the arrows.

Referring more particularly to the drawings wherein similar reference characters designate corresponding parts throughout the several views, the device shown formed according to the invention comprises a gage head designated generally at 1, a rotatably mounted shaft 2, and a pivotally mounted actuating arrangement designated generally at 3.

The gage head 1 comprises a housing member 4 having the housing sections 5 and 6 separated by the wall 7. The dial 8, which is non-magnetic material or plastic and which is secured to the peripheral flange 9 on the housing member 4 and the cover glass 10, of transparent plastic or glass, is secured to said flange 9 over the dial 8.

The housing section 6 is closed by the member 11 which is secured to the housing member 4 by screws or the like 12, and the member 11 has a central recess or opening and a depending annular flange 13 as hereinafter described.

The pivot post 14 is mounted in an opening in the wall 7 and has pivotally mounted thereon the pivot member 15 which carries the pointer or dial indicator 16. Secured to the pivot 15 is the bar magnet 17 which is adapted to be pivoted or rotated upon similar movement of and through the magnetic force of another bar magnet 18 secured to the upper end of the shaft or rod 2 in the housing section 6 and said magnet 18 is adapted to be pivoted upon pivotal movement of said shaft 2 whereupon corresponding pivotal movement is effected of the magnet 17 which thereby causes rotation of the pivot member 15 and pointer 16.

The cylindrical or tubular member 19 surrounding the rod or shaft 2 has one end secured to the flange 13 on the member 11 and has its opposite end secured to the flange 20 on the pivot fork 21 on which is pivotally mounted the actuating arrangement 3 by the pivot pin 22.

The pivotally mounted actuating arrangement 3 comprises the segmental gear 23 adapted to mesh with the gear 24 on the reduced end of the shaft 2 to thereby drive said gear 24 and thereby drive the shaft 2.

The arrangement also includes the float 25 and the float arm 26 and counterweight 27 which are effectively integrally formed or united with the segmental gear 23.

This unitary construction is preferably formed by die casting as follows:

A float arm 26 of proper length is inserted in the die and a stop is adjusted with respect to said arm as predetermined to produce the correct counterbalance of counterweight 27 for the length of float arm 26 employed and then casting the weight 27, gear 23 and anchoring the float arm 26 in the counterweight 27 in a single operation. The float 25 may then be secured to the float arm 26 by inserting the end of the float arm 26 into the float 25 through an opening in the wall of the float and soldering to seal the opening and secure the float 25 and float arm 26 in assembled relation.

By employing this process the weight of the counterweight 27 may be accurately controlled relative to the length of float arm 26 employed and thus providing an effectively unitary construction of float arm, weight and segmental gear and as these elements are effectively integral the assembly of the device is made easier, simpler and much more economical and also assuring that the parts will be permanently retained in desired assembled relation.

The float arm 26 may be adjusted by bending relative to the weight 27 as shown in Figs. 3 and 4 until the rod and float will hang vertical with weight 27 adjacent member 19 when the tank is empty. This adjusts the position of pointer 16 on dial 8.

In operation the float 25 will be adjusted according to the quantity of fluid in the tank. As this float 25 moves, it causes pivotal movement of float arm 26 and gear 23 which is engaged with gear 24 and causes rotation of said gear 24 and therethrough the shaft 2 and magnet 18.

The pivotal movement of magnet 18 effects corresponding pivotal movement of magnet 17 and pivot 15 to which magnet 17 is secured and on which is secured pointer 16 which indicates on dial 8 the quantity of fluid in the tank.

From the foregoing it will be seen that I have provided simple, efficient and economical means and process for obtaining all of the objects and advantages of the invention.

Having described my invention, I claim:

In a device of the character described, a dial and associated indicating means, means for causing movement of said indicating means relative to said dial, a rotatable hub member, a segmental gear member formed on one end of said hub engaging said last mentioned means, an arm projecting from the intermediate portion of said hub, an angularly disposed arm supported by said first mentioned arm, a counterbalance weight formed on the outer end of said angularly disposed arm, all formed as an integral die casting, and a float supporting arm positioned in and extending outwardly from the opposite end of said last mentioned arm and secured therein a calculated predetermined distance during the die casting operation.

JAMES Y. TAYLOR.

REFERENCES CITED

The following references are of record in the file of this patent:

UNITED STATES PATENTS

| Number | Name | Date |
|---|---|---|
| 904,519 | Dyer | Nov. 24, 1908 |
| 951,753 | Anderson | Mar. 8, 1910 |
| 1,233,338 | Gelatt | July 17, 1917 |
| 1,308,620 | Broad | July 1, 1919 |
| 1,432,157 | Cox | Oct. 17, 1922 |
| 1,599,221 | Ehrbar | Sept. 7, 1926 |
| 1,798,434 | Ruopp | Mar. 31, 1931 |
| 2,021,615 | Stuart | Nov. 19, 1935 |
| 2,121,675 | White | June 21, 1938 |
| 2,300,614 | Connolly et al. | Nov. 3, 1942 |

FOREIGN PATENTS

| Number | Country | Date |
|---|---|---|
| 86,249 | Austria | Nov. 10, 1921 |

OTHER REFERENCES

A book entitled: "Die Casting for Engineers," published by The New Jersey Zinc Co., 160 Front Street, New York, N. Y., copyright, 1942.